(12) United States Patent
Sun

(10) Patent No.: US 7,905,656 B2
(45) Date of Patent: Mar. 15, 2011

(54) DIFFERENTIAL PASSIVE CALORIMETER

(75) Inventor: Jiandong Sun, Beijing (CN)

(73) Assignee: Beijing Union University, Beijing (CN)

( * ) Notice: Subject to any disclaimer, the term of this patent is extended or adjusted under 35 U.S.C. 154(b) by 479 days.

(21) Appl. No.: 12/006,812

(22) Filed: Mar. 31, 2008

(65) Prior Publication Data
US 2008/0273571 A1    Nov. 6, 2008

(51) Int. Cl.
*G01K 17/10* (2006.01)
(52) U.S. Cl. ............... 374/31; 374/10; 436/147; 422/51
(58) Field of Classification Search .............. 374/10–12, 374/29–40, 43–45, 100, 112, 115, 137, 208; 436/147; 422/51
See application file for complete search history.

(56) References Cited

U.S. PATENT DOCUMENTS

| | | | | |
|---|---|---|---|---|
| 3,777,562 | A * | 12/1973 | Clingman, Jr. ................. | 374/37 |
| 5,167,927 | A * | 12/1992 | Karlson ......................... | 422/90 |
| 5,624,187 | A * | 4/1997 | Reading ......................... | 374/11 |
| 5,759,862 | A * | 6/1998 | Vander Heyden et al. .... | 436/147 |
| 6,371,147 | B1 * | 4/2002 | Philippe ......................... | 137/6 |
| 6,627,451 | B2 * | 9/2003 | Pinhack et al. ............... | 436/147 |
| 6,913,383 | B2 * | 7/2005 | Jorimann et al. .............. | 374/31 |
| 7,704,748 | B2 * | 4/2010 | Schaeffer et al. ............. | 436/160 |
| 7,744,273 | B2 * | 6/2010 | Nagasawa et al. ............ | 374/31 |

FOREIGN PATENT DOCUMENTS

| | | |
|---|---|---|
| CN | 2484551 Y | 4/2002 |
| CN | 2672402 Y | 1/2005 |
| CN | 2742410 Y | 11/2005 |
| CN | 1851425 A | 10/2006 |
| CN | 101382459 | 3/2009 |
| CN | 101387353 | 3/2009 |

OTHER PUBLICATIONS

Sun, Jiandong, "Passive Heat meters Based on Mechanical Innovative Design", Theses Collection of Annual Conference of China Association for Science & Technology in 2006, Sep. 1, 2006, pp. 266-270, vol. 2, published in China (Entire document and translation of entire document supplied).

* cited by examiner

*Primary Examiner* — Gail Verbitsky
(74) *Attorney, Agent, or Firm* — Pedersen and Company, PLLC; Ken J. Pedersen; Barbara S. Pedersen

(57) ABSTRACT

A passive differential calorimeter, comprising an inflow control valve (2"), differential measurement means (4") including the driving part of an input water meter (15) and the driving part of an output water meter (16), a back flow control valve (9") and connecting pipes between them, wherein both the inflow control valve and the output flow control valve being temperature controlled valve, i.e. the flow through the valve is controlled according to the medium temperature, and the inlet of the inflow meter being connected with the high temperature medium end and the inlet of the output water meter being connected with the low temperature medium end, characterized in that: the medium inlet (1") is connected with tee (17) which separates the medium flow that into the calorimeter in two lines, one of which (bypass line) flows into the inlet of the inflow control valve (2"), of which the outlet is connected with another tee (7"), and the other of the two lines (measurement line) flows into the inlet (18) of the flow meter (15), of which the outlet (19) is connected with the tee (7"), the tee (7") being connected with the inlet of a radiator (8").

6 Claims, 4 Drawing Sheets

DIFFERENTIAL PASSIVE CALORIMETER

CROSS-REFERENCE TO RELATED APPLICATION

The present invention claims the benefit of the co-pending Chinese application No. 200710122051.1, which is applied by Beijing United University on 20 Sep. 2007 and the benefit of the co-pending Chinese patent application No. 200710195619.2, which is applied also by Beijing United University on 4 Dec. 2007.

FIELD OF THE INVENTION

The invention relates to a calorimeter, in particular to a passive differential calorimeter.

BACKGROUND OF THE INVENTION

A conventional calorimeter is driven with electricity, which is troublesome usually A battery powered calorimeter, for example will fail in heat measurement once the electricity is exhausted and needs replacing the cell immediately. Heat measurement would also break off soon after failure of power supply or electric connection of an AV powered calorimeter, causing much inconvenience for the users as well as considerable cost in time and labor for the heat providers to fix it up. Besides, there is always somewhat economic loss for the heat providers due to the cease of heat measurement.

A calorimeter in which no electricity is used is described in Chinese patent Application CN200610083212.6, which is herein incorporated by reference entirely. FIG. 1 is a schematic view of the passive differential calorimeter applied in the said patent application. The passive differential calorimeter of the said suspended patent application comprises an inflow dispenser 2, a calorie counter 4, a back flow dispenser 9 and connecting pipes between them. The inflow dispenser 2 is connected with the calorimeter inlet 1. The outlets of the inflow dispenser 2 are connected with pipe 3 and a bypass pipe 6 respectively. The pipe 3 is connected with the calorie counter 4, which is in turn connected with the bypass pipe 6 at a connector 7 through a pipe 5. The connector 7 is connected with the inlet of radiator 8, of which the outlet is in turn connected with back flow dispenser 9. The outlets of the back flow dispenser 9 are connected with pipe 10 and a bypass pipe 11 respectively. The pipe 10 is connected with calorimeter 4. The calorimeter 4 is connected with the bypass pipe 11 with a connector 13 through a pipe 12. The connect 13 is connected with the calorimeter outlet 14.

When water at a certain temperature flows into the inflow dispenser 2 through the calorimeter inlet 1, the inflow dispenser 2 will automatically dispense the flow into the calorie counter 4 and the bypass pipe 6 according to the temperature of the water. The water flow into the calorie counter 4 is recorded (in form of an angular form), indicating the input calorie of the radiator 8. Water that flows out of the radiator 8 flows into the back flow dispenser 9, which then automatically dispense the flow into the calorie counter 4 and the bypass pipe 11 according to the temperature of the back water. The water into the calorie counter 4 is recorded (in form of an angular). Certain calculating of the recorded angles, which resemble calorie of inflow and back flow respectively, by means of the differential mechanism of the calorimeter 4 results the output of the calorie counter 4 in form of an angular.

The said Chinese patent application also described a calorie counter comprising a first turbine connected with the first inlet and a second turbine connected with the second inlet, which are both connected with the differential mechanism, wherein the fluid flowing into the calorie counter from the first and second inlet makes the first and second turbine rotate respectively, which are transmitted into the calorie counter through the differential mechanism and a gearing mechanism to display the calorie consumption of the radiator system.

Hot water flows into the calorie counter from the first inlet, through the turbine and out of it from the first outlet. On the input shaft of the turbine is installed a bevel gear that engages with a planetary bevel gear. The water which flows into calorie counter through the second inlet flows through the second turbine and out of it from the second outlet. On the output shaft of the turbine is installed a bevel gear that also engages with a planetary bevel gear. The planetary bevel gears are rotatably fitted to the planetary carriers which are in turn securely coupled to the big bevel gear installed on the output shaft. The big bevel gear engages with the small bevel gear installed on the shaft. The shaft transmits the rotation into the counter which displays the calorie consumption of the radiator system.

When water flows through the calorie counter and makes the turbines rotate, the turbines will drive the bevel gears in the opposite direction respectively. When the water temperature through the inflow dispenser differs from and that through the back flow dispenser, the flow dispenser and the back flow dispenser will dispense different water flow to the first and the second inlet according to the temperatures. Different turbine flow results in different rotation speed of the bevel gears. Because the bevel gears rotate in opposite directions and different speed, the planetary bevel gear rotates about the axial of the bevel gear as well as that of itself, which drives the big bevel gear rotate by means of the planetary carrier and then drives the shaft rotate through the small bevel gear so as to display the calorie consumption of the radiator system in the counter.

The application disclosure also described a flow dispenser in the passive differential calorimeter. As shown in FIG. 2, the flow dispenser comprises an inlet 43, a first outlet 41 and a second outlet 42. It also comprises a slide valve 30 inside the calorimeter, one end of which is pressed against a memory alloy element 33 and the other against a spring 34. The spring 34 presses the slide valve 30 towards the memory alloy element 33. The flow dispenser also comprises a slide valve position adjustment means composed by a position adjustment screw 35 and a jack bolt 36. The adjustment screw 35 may be rotated to move the jack bolt 36 up and down in the flow dispenser, thereby pushing the memory alloy element 33 so as to adjust the position of the slide valve 30.

After entering into a pipe 29 through the inlet 43, high temperature water will flow into a pipe 31 and 32 through the slide valve 30 and then out of the first outlet 41 and the second outlet 42. The flows of the first outlet 41 and the second outlet 42 are controlled by the position of the slide valve 30, which is controlled by the memory alloy element 33 that may stretch or contract in correspondence with the water temperature. The spring 34 cooperates with the memory alloy element 33 to keep the slide valve 30 in place.

The flow dispenser of the passive differential calorimeter is large in size due to the needs to control three inlets or outlets. The valve core is hard to design as the flow dispenser controls both the measurement line and the bypass line. Besides, the flow dispenser has also the disadvantages of complicated design, difficult to adjust and maintain.

SUMMARY OF THE INVENTION

The purpose of the invention is to overcome the above shortcomings of the prior art, by providing a passive differential calorimeter with smaller size and simpler structure, which is easier to be operated and maintained and can be easily designed and produced with lower cost.

To achieve the above purpose, a passive differential calorimeter is provided which comprises an inflow control valve, a differential measurement means, a back flow control valve and connecting pipes between them. Both the inflow control valve and the output flow control valve are parallel to the differential measurement means. The medium (water) passes a tee tube and flows into the passive differential calorimeter through two lines: one (bypass line) flows directly through the inflow control valve and into a tee before the radiator; and the other (measurement line) flows through the input water meter and into the tee before the radiator. The two lines meet and the medium flows to the inlet of the radiator. The medium out of the outlet of the radiator flows through a tee and then is divided into two lines: one (measurement line) flows into a tee before the water outlet through the output water meter; and the other (bypass line) flows through the output flow control valve and into the tee before the water outlet. After meeting of the medium from the two lines it flows towards the water outlet.

The present invention also provides a differential measurement means in the passive differential calorimeter, which comprises a high temperature medium flow meter, a low temperature medium flow meter, a differential and a counter. When high temperature medium flows into the inlet and out of the outlet of the high temperature flow meter, it actuates the rotation of the turbine of the high temperature flow meter, which is then transmitted to one of the input shafts of the differential; and when low temperature medium flows into the inlet and out of the outlet of the low temperature flow meter, it actuates the rotation of the turbine of the low temperature flow meter, which is then transmitted to the other of the input shafts of the differential. Driven by the two input shafts of the differential, it transmits the combined movements to the counter, which will display the result of the differential.

The invention also provides a flow control valve in the passive differential calorimeter for automatically adjusting the flow according to the medium temperature. The flow control valve comprises an inlet, an outlet and a spring memory alloy. The flow control valve may control the position of its rod according to the temperature change. The amount of opening of the valve decreases as the temperature increases, and vice versa. So the medium flow decreases as the medium temperature increases, or increases as the medium temperature decreases when medium pressure is constant, It is very easy for those skilled in the art that a memory alloy is used to effect the flow control valve.

It is apparent for those skilled in the art that the passive differential calorimeter of the present invention has a flow control valve of smaller size and simpler structure, which has only two in-or-outlets (FIG. 4), while has whole of the functions of the Chinese application No. CN200610083212.6, in which there three, which has three in-or-outlets (FIG. 2) and thus complicated and large.

It is also apparent that the flow control valve in the application CN200610083212.6 controls the flows of both the measuring line and the bypass line, it is therefore difficult for the design the valve core and the valve adjustment and maintenance. On contrast the flow control valve of the present invention controls the flow of only one bypass line, and thereby allows easy structure design and adjustment and maintenance.

The flow control valve of the passive differential calorimeter of the present invention not only has the advantages of simple structure, but also is easy to be designed and made at low cost. Furthermore, it may be easily adjusted due to the outside location of the adjustment button (35" in FIG. 4).

DESCRIPTION OF THE EMBODIMENTS

The medium referred herein may be any fluid or semi-fluid, and water is taken as an example hereinafter for the ease of explanation.

Figure 1:
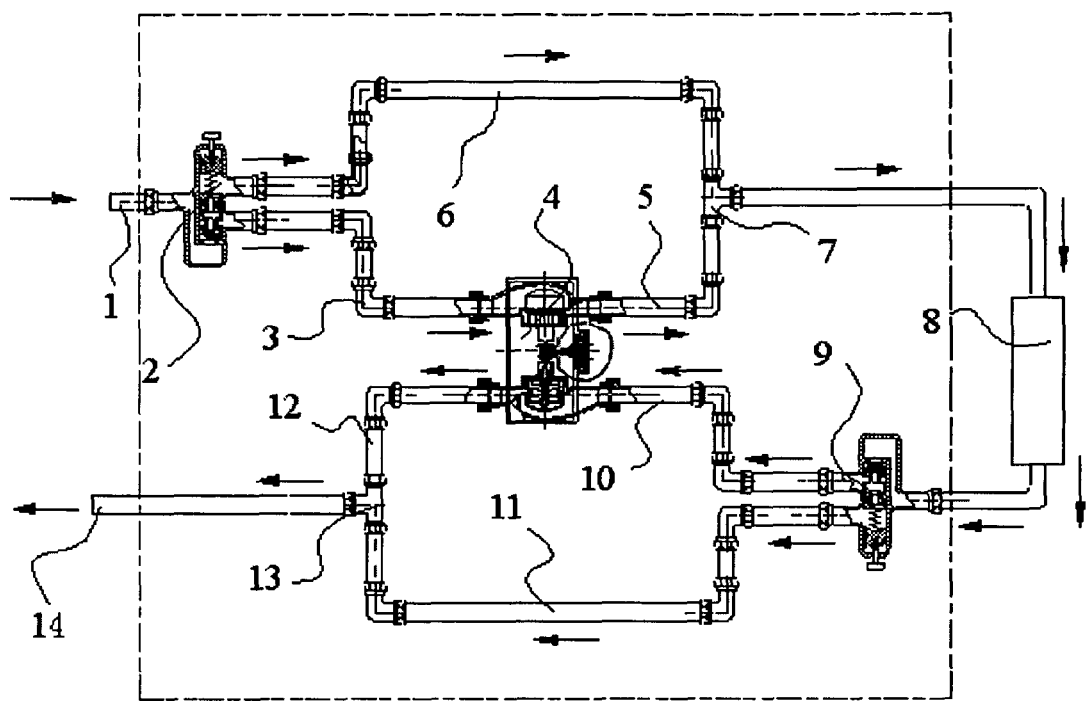
FIG. 1 is a general schematic view of a prior art passive differential calorimeter.
Figure 1A:
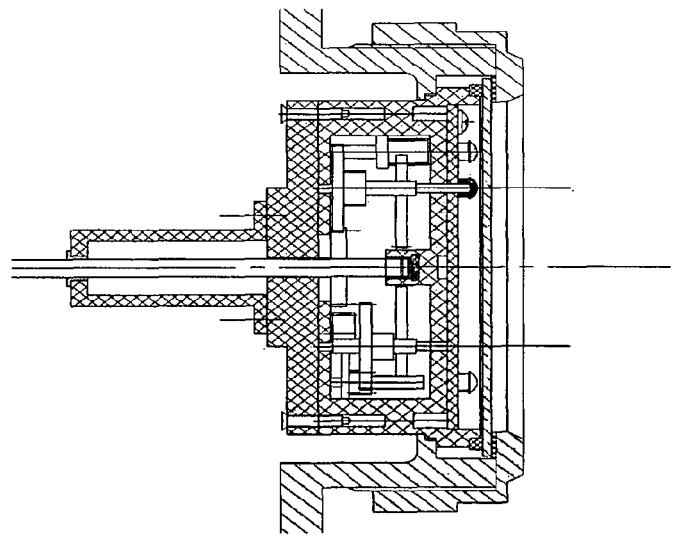
FIG. 1*a* is an enlarged view showing the counter of the passive differential calorimeter shown in FIG. 1, which is circled in FIG. 1.
Figure 2:
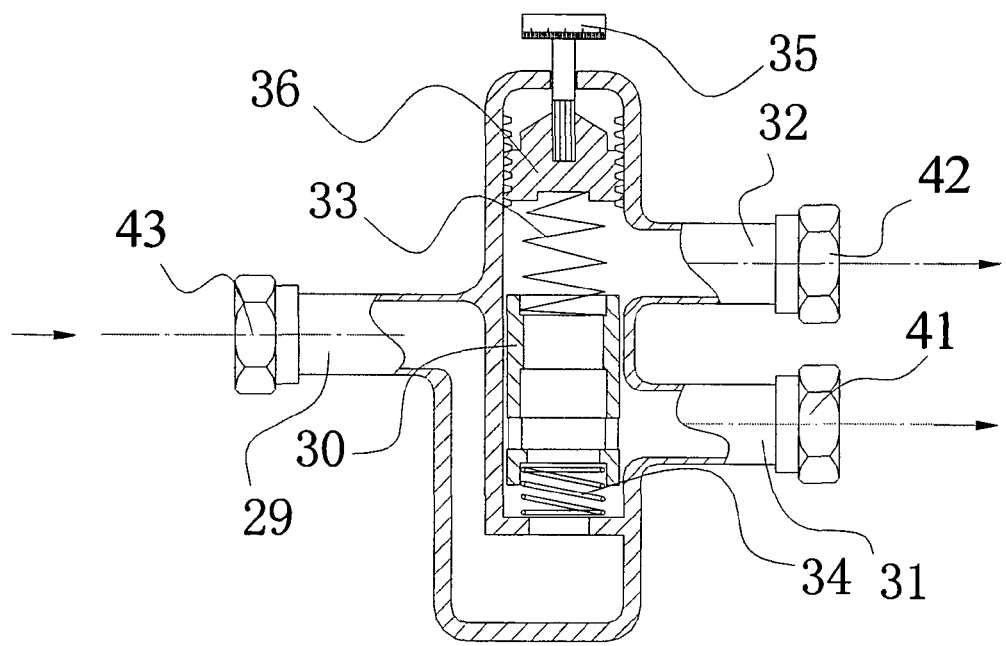
FIG. 2 is a schematic view of a flow dispenser in the prior art passive differential calorimeter.
Figure 3:
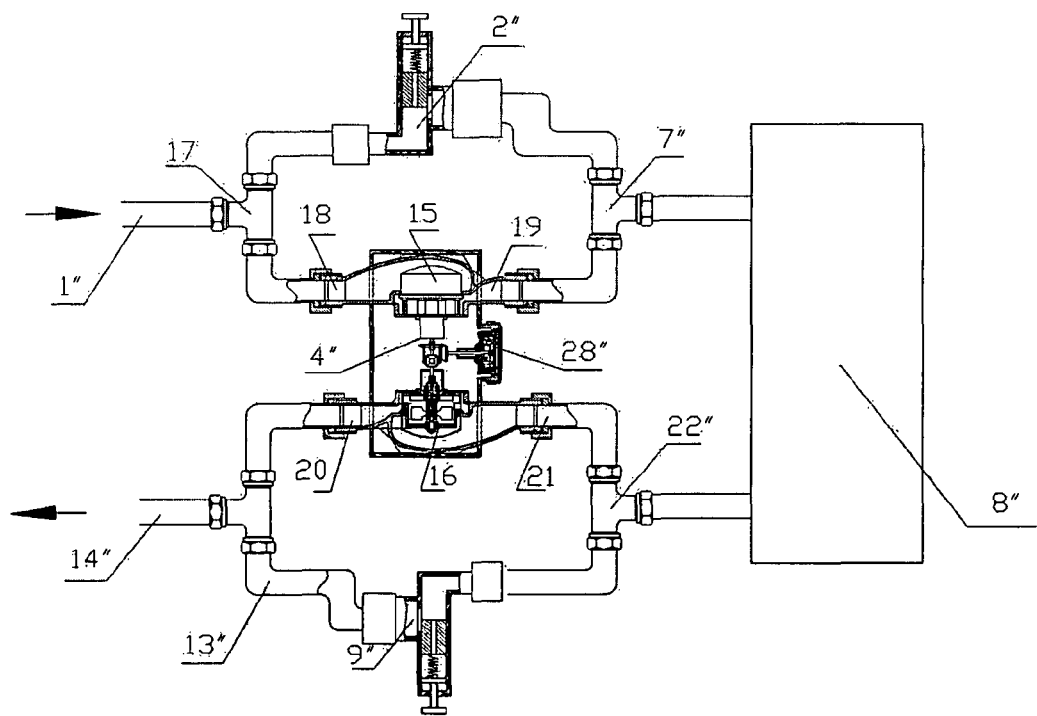
FIG. 3 is a schematic view of the best embodiment of the passive differential calorimeter of the present invention.

FIG. 3 shows the structure of the best embodiment of the present invention, in which the differential measurement device is shown with heavy lines.

As shown in FIG. 3, the passive differential calorimeter (calorimeter for short) of the present invention comprises an inflow control valve 2", differential measurement means 4", a back flow control valve 9" and connecting pipes between them. The differential measurement means 4" comprises an inflow meter 15 and an output flow meter 16. The medium inlet 1" is connected with tee 17. The medium separated by the Tee flows into the calorimeter in two lines, one of which (bypass line) through the flow control valve 2" that is connected with tee 7", and the other of which (measurement line) through the inlet 18 of the water meter 15, of which the outlet 19 is connected with the tee 7". The tee 7" is connected with the inlet of a radiator 8", of which the outlet is connected with tee 22 which branches into two lines, one of which (bypass line) is connected with the inlet of the flow control valve 9" that is connected with tee 13", and the other of which (measurement line) is connected with the inlet 21 of the flow meter 16 of which the outlet 20 is connected with the tee 13". The tee 13" is connected with medium outlet 14".

High temperature medium of a certain heat flows in through the medium inlet 1" of the calorimeter, and is divided into two lines by the tee 17 before entering the calorimeter, one of which (bypass line) flows into the tee 7" through the flow control valve 2" and the other of which (measurement line) flows into the inlet 18 of the flow meter 15 and then into the tee 7" through the outlet 19 of the flow meter 15. The two lines of medium meet at the tee 7" and then enter the inlet of the radiator 8". After heat radiation of the radiator, the medium of a low temperature flows out of the outlet of the radiator 8" and is divided into two lines by the tee 22, one of which (bypass line) flows into the tee 13" through the flow control valve 9" and the other one of which (measurement line) flows in to the inlet 21 of the water meter 16 and then out of the outlet 20 of the water meter 16 and then into the tee 13". The two lines of medium meet at the tee 13" and then flow out of the outlet 14" of the calorimeter.

The operation principal of the passive differential calorimeter of the present invention is understandable for those skilled in the art after reading the description.

As shown in FIG. 3, when medium (water) of a certain temperature, flow and pressure flows into the calorimeter through the inlet 1" and out of it through the outlet 14", the opening amount of the flow control valve 2" is controlled according to the water temperature. The higher the water temperature is, the larger it opens, and the less medium flows through it. Reduction of the flow through the flow control valve 2" results increase of the flow through flow meter 15 due to the constant total flow through the tee 17, which makes increase of the rotation of the speed of the flow meter turbine and that of the input shaft of the differential measurement means 4". On the contrary, if the water temperature through the flow control valve 2" is reduced, the speed of the input shaft of the differential measurement means 4" will be reduced.

After the heat radiation of the radiator 8", the water of a lower temperature flows into the tee 22 through the outlet of the radiator, and then into the flow control valve 9" and the flow meter 16 respectively. By the same token, when the temperature of the water through the flow control valve 9" grows, the valve open less and the flow through it will be reduced so as to increase the flow through the flow meter 16, the rotation speed of the turbine and that of the other input shaft of the differential measurement means 4". On contrary it will decrease. The rotation of the two input shafts of the differential measurement means 4" represent the flow rates into and out of the calorimeter. The figure displayed on the counter 28" of the differential measurement means 4" represents the calorie consumption of the radiator 8".

Figure 4:
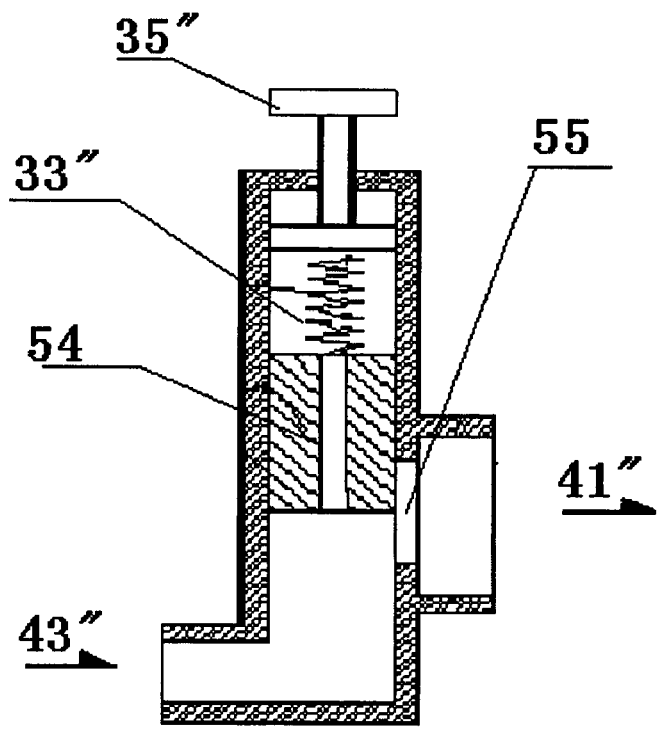
FIG. 4 is a schematic view of a flow control valve in the passive differential calorimeter shown in FIG. 3.

As shown in FIG. 4, the flow control valve of the present invention comprises an inlet, an outlet, a spring memory alloy, a spool, an opening and a position adjustment button. According to the temperature, flow through the flow control valves 2" and 9" in the calorimeter is controlled by the two valves respectively, of which the structure is shown in FIG. 4, in which are shown an inlet 43" of the flow control valve, an outlet 41" of it and a spring memory alloy 33" or a temperature sensor of other material, by which position of the spool 54 can be controlled according to temperature such that the area of the opening 55 which is on a plan and with specific shape, that is not covered by the valve rod is reduced as the temperature rises, vice versa. The flow of the medium therefore decreases as the temperature of the medium rises and increases as the temperature of the medium becomes lower, when pressure of the medium keeps constant. Number 35" in FIG. 4 represents a position adjustment button which is used to adjust the force of the spring.

Figure 5:
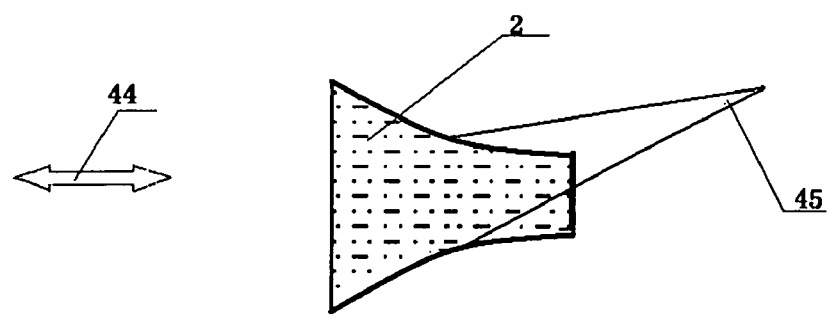
FIG. 5 is a schematic view of the shape of an opening of the flow control valve in the passive differential calorimeter shown in FIG. 3.

FIG. 5 shows the opening state of the flow control valve of the present invention. The shape of the opening of it is shown in FIG. 5 when the length of the memory alloy is proportional to the temperature of the water. The double arrow 44 in the figure shows the moving direction of the valve rod 54. Number 45 represents the curve of the opening on it's both sides.

Equation of the curve of both sides of the opening is as following:

$$y = \pm \frac{ABC}{2(1 - \Delta TB + ABl)^2}$$

in which A is a coefficient ($1/°$ C.);
B is a proportional coefficient ($°$ C./mm);
C is the area of the section of the bypass tube (mm$^2$);
$\Delta T$ is the range of measured temperature set in the calorimeter, $\Delta T = T_{max} - T_{min}$ ($°$ C.);
$T_{min}$ is the minimum measured temperature set in the calorimeter;
$T_{max}$ is the maximum measured temperature set in the calorimeter;
l is the displacement of the spool (the extension or retraction).

Figure 6:
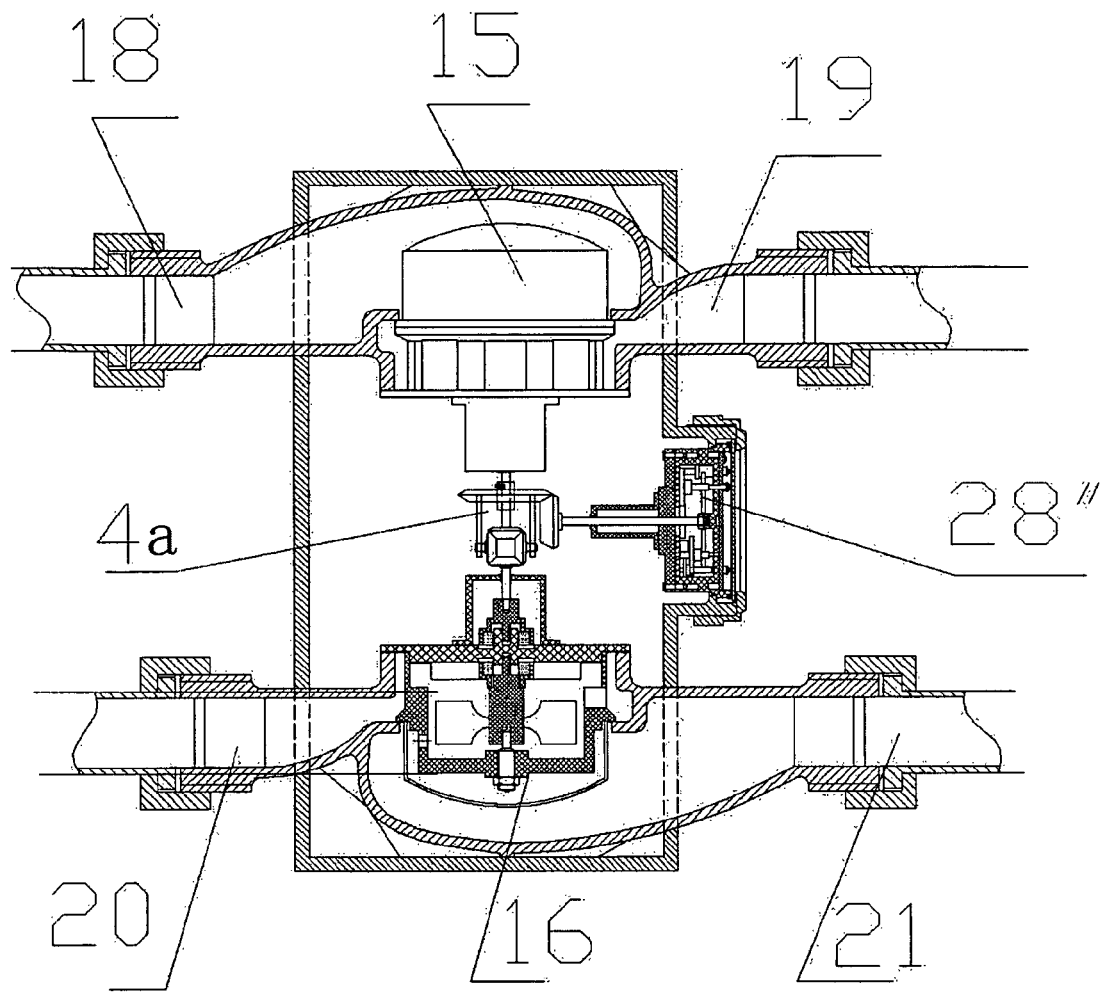
FIG. 6 is a schematic view of the structure of a differential measurement means in the passive differential calorimeter shown in FIG. 3.

FIG. 6 shows the differential measurement means according to the present invention, which includes a water meter for high temperature media 15, a water meter for low temperature media 16, a differential 4" and a counter 28".

As shown in FIG. 6, in the differential measurement means according to the present invention, when high temperature medium flow into inlet 18 of the high temperature water meter and out of outlet 19, the turbine of the water meter 15 is driven to rotate, which in turn is transmitted to one of the input axles of the differential 4"; when low temperature medium flow into inlet 21 of the low temperature water meter 16 and out of the outlet 20, the turbine of the water meter 16 is driven and rotate, which in turn is transmitted to another input axle of the differential 4". Driven jointly by the rotation of both input axles, the differential 4" transmit the combined movement into counter 28", which shows the result of the combination.

The above description in connection with a preferred embodiment is only an example of the present invention, which is not limited by this example, on the contrary, is intended to cover various modifications and equivalent arrangements included within the spirit and scope of the appended claims.

I claim:

1. A passive differential calorimeter, comprising an inflow control valve (2"), differential measurement means (4") including the driving part of an input water meter (15) and the driving part of an output water meter (16), a back flow control valve (9") and connecting pipes between them, wherein both the inflow control valve and the output flow control valve are temperature controlled valve, i.e. the flow through the valve is controlled according to the medium temperature, the inlet of the inflow meter is connected with the high temperature medium end and the inlet of the output water meter is connected with the low temperature medium end, characterized in that: the medium inlet (1") is connected with a tee (17) which separates the medium flow that flows into the calorimeter in two ways, one of which (bypass line) goes into the inlet of the inflow control valve (2"), of which the outlet is connected with another tee (7"), and the other of the two lines (measurement line) goes into the inlet (18) of the flow meter (15), of which the outlet (19) is connected with the tee (7"), which in turn is connected with the inlet of a radiator (8"); and the outlet of the radiator (8") is connected with the third tee (22) which divides into two lines, one of which (bypass line) is connected with the inlet of the back flow control valve (9"), of which the outlet is connected with fourth tee (13"), and the other of the two lines (measurement line) is connected with the inlet (21) of the flow meter (16), of which the outlet (20) is connected with the tee (13") connected with medium outlet (14").

2. The passive differential calorimeter according to claim 1, wherein the flow control valve comprises an inlet (43"), an outlet (41"), a rod (4), an opening (55) and a position adjusting button, wherein a spring memory alloy (33") is fitted on the upper end of the rod (4) which may vary the height of the rod (4) relative the opening (55) according to the temperature so as to adjust the flow out of the valve.

3. The passive differential calorimeter according to claim 2, wherein the opening (55) of the valve is in a plane, the area of the part of the opening that is not blocked by the rod decreases as the temperature rises or increases as the temperature decrease; equation of the curve of both sides of the opening is as following:

$$y = \pm \frac{ABC}{2(1 - \Delta TB + ABl)^2}$$

in which A is a coefficient (1/° C.);
B is a proportional coefficient (° C./mm);
C is the area of the section of the bypass tube (mm$^2$);
$\Delta T$ is the range of measured temperature set in the calorimeter, $\Delta T = T_{max} - T_{min}$ (° C.);
$T_{min}$ is the minimum measured temperature set in the calorimeter;
$T_{max}$ is the maximum measured temperature set in the calorimeter (° C.);
l is the displacement of the spool (the extension or retraction of the memory alloy (mm)).

4. The passive differential calorimeter according to claim 1, wherein the differential measurement means comprises flow meters, turbines and a counter, an inflow meter (15) composed of an input turbine and input and output shafts, the driving part of an output water meter (16) composed of an output turbine and input and output shafts, a counter and a differential (4"), the input shaft of which transmits the resultant movement actuated jointly by the output shafts of the inflow meter and the output water meter to the counter (28") to display the calorie consumption of the radiator system (8"), the inlet of the inflow meter is connected with the high temperature medium input end, the outlet of the inflow meter is connected with the radiator, and the inlet of the output water meter is connected with the outlet of the radiator.

5. The passive differential calorimeter according to claim 2, wherein the differential measurement means comprises flow meters, turbines, a counter, an inflow meter (15) composed of an input turbine and input and output shafts, the driving part of an output water meter (16) composed of an output turbine and input and output shafts, a counter and a differential (4"), the input shaft of which transmits the resultant movement actuated jointly by the output shafts of the inflow meter and the output water meter to the counter (28") to display the calorie consumption of the radiator system (8"), the inlet of the input water meter is connected with the high temperature medium input end, the outlet of the input water meter is connected with the radiator, and the inlet of the output water meter is connected with the outlet of the radiator.

6. The passive differential calorimeter according to claim 3, wherein the differential measurement means comprises flow meters, turbines a counter, an inflow meter (15) composed of an input turbine and input and output shafts, the driving part of an output water meter (16) composed of an output turbine and input and output shafts, a counter and a differential (4"), the input shaft of which transmits the resultant movement actuated jointly by the output shafts of the inflow meter and the output water meter to the counter (28") to display the calorie consumption of the radiator system (8"), the inlet of the inflow meter is connected with the high temperature medium input end, the outlet of the inflow meter is connected with the radiator, and the inlet of the output water meter is connected with the outlet of the radiator.

* * * * *